United States Patent [19]
Nagasawa

[11] Patent Number: 6,105,943
[45] Date of Patent: Aug. 22, 2000

[54] ACTIVE DAMPING OSCILLATOR HAVING NON-CONNECTED SHAFT MEMBER AND OUTER SLEEVE MOVABLE RELATIVE TO EACH OTHER BY ENERGIZATION OF COILS

[75] Inventor: Masahiko Nagasawa, Kani, Japan

[73] Assignee: Tokai Rubber Industries, Ltd., Japan

[21] Appl. No.: 09/314,377

[22] Filed: May 19, 1999

[30]     Foreign Application Priority Data

Jun. 5, 1998  [JP]  Japan .................................. 10-157503

[51] Int. Cl.[7] ...................................................... F16M 5/00
[52] U.S. Cl. ................................ 267/140.14; 267/140.15
[58] Field of Search ........................ 267/140.11, 140.14, 267/140.15

[56]               References Cited

U.S. PATENT DOCUMENTS

| 5,231,336 | 7/1993 | van Namen . |
| 5,344,129 | 9/1994 | Ide et al. .............................. 267/140.14 |
| 5,492,312 | 2/1996 | Carlson ............... 267/140.14 |
| 5,718,418 | 2/1998 | Gugsch . |
| 5,905,317 | 5/1999 | Aoki .................................... 267/140.14 |
| 5,947,456 | 9/1999 | Aoki .................................... 267/140.14 |
| 5,947,457 | 9/1999 | Swanson et al. ................... 267/140.14 |
| 5,992,582 | 11/1999 | Lou et al. ............................ 267/140.14 |

FOREIGN PATENT DOCUMENTS

| 61-220925 | 10/1986 | Japan . |
| 64-83742 | 3/1989 | Japan . |
| 6-235438 | 8/1994 | Japan . |
| B2-2510914 | 4/1996 | Japan . |
| B2-2510915 | 4/1996 | Japan . |

*Primary Examiner*—Chris Schwartz
*Attorney, Agent, or Firm*—Wall Marjama Bilinski & Burr

[57]                ABSTRACT

Active damping oscillator including first magnetic pole portions fixed to one of an inner shaft member and an outer sleeve, second magnetic pole portions fixed to the other of the shaft member and outer sleeve, at least one permanent magnet associated with the first magnetic pole portions, and at least one coil associated with the second magnetic pole portions, and wherein the first magnetic pole portions and the second magnetic pole portions are opposed to each other in a radial direction of the shaft member with a predetermined radial gap therebetween, and are offset from each other in an axial direction of the shaft member such that the shaft member is held in a predetermined neutral axial position by first magnetic forces of the first magnetic pole portions which act between the first and second first magnetic pole portions, in a non-energized state of at least one coil, and such that the shaft member and outer sleeve are axially moved relative to each other against the first magnetic forces by second magnetic forces which are generated upon energization of the at least one coil and which act between the first and second magnetic pole portions.

10 Claims, 8 Drawing Sheets

ACTIVE DAMPING OSCILLATOR HAVING NON-CONNECTED SHAFT MEMBER AND OUTER SLEEVE MOVABLE RELATIVE TO EACH OTHER BY ENERGIZATION OF COILS

This application is based on Japanese Patent Application No. 10-157503 filed Jun. 5, 1998, the content of which is incorporated herein by reference.

BACKGROUND OF THE INVENTION

1. Field of the Invention

The present invention relates to an active damping oscillator suitably usable for an active vibration damping device which is attached to a vibrating member or a member of a vibration transmitting system, for providing an active damping effect with respect to a vibration of such a vibrating member or an object associated with such a vibration transmitting system.

2. Discussion of the Related Art

For damping a vibration of a vibrating member, there have been generally employed various vibration dampers such as shock absorbers, vibration damping means which utilizes a damping effect exhibited by rubber or other elastic materials, and vibration isolating or insulating means which utilizes a spring effect exhibited by coil springs or rubber or other elastic materials. These vibration dampers are all adapted to provide a passive vibration damping or isolating effect, and are not capable of sufficiently damping or isolating a vibration whose characteristics tend to vary. In the light of this drawback of the known vibration dampers, there have recently been developed active vibration damping devices adapted to oscillate a vibrating member or a member of a vibration transmitting system, for actively or positively damping a vibration whose characteristics tend to vary. Example of such active vibration damping devices are disclosed in JP-A-61-220925 and JP-A-64-83742.

The active vibration damping device requires an active damping oscillator for generating an oscillating force or oscillatory movements. In the active damping oscillator, the frequency of the generated oscillation is required to be easily and accurately controlled. To meet this requirement, the active damping oscillator as disclosed in JP-A-6-235438 includes: a first and a second support member which are connected to each other by a rubber member, a metal spring or any other elastic member, such that the first and second support members are displaceable relative to each other; a permanent magnet which cooperates with one of the first and second support members to form a closed magnetic path; and a coil movably disposed in a magnetic gap in the closed magnetic path and fixed to the other of the first and second support members, so that the first and second support members are oscillated relative to each other by an oscillating force generated upon energization of the coil, namely, by a Lorentz force (electromagnetic force) generated by the energized coil.

In the active damping oscillator described above, the first and second support members connected to each other by the elastic member constitute a vibration system having a certain natural frequency (undamped natural frequency or frequency of vibration of the normal mode), so that the waveform of a control signal or electric current to be applied to the coil and the waveform of the generated oscillation are not linear, and have a high rate of change in the phase, in a frequency band near the natural frequency of the vibration system, in particular. Accordingly, the active damping oscillator suffers from difficult control of the generated oscillation.

U.S. Pat. No. 5,231,336 and U.S. Pat. No. 5,718,418 disclose an active damping oscillators wherein the first and second support members, which are not connected to each other by an elastic member, are positioned and displaced relative to each other by a magnetic force.

In the active damping oscillators described just above, an oscillating force is based on a Lorentz force (electromagentic force) generated upon energization of a coil disposed in a magnetic field. Accordingly, these active damping oscillators suffer are less likely to be capable of efficiently generating an oscillating force with high stability. Described more specifically, the oscillator disclosed in U.S. Pat. No. 5,231,336 is arranged such that the coil is disposed in an open magnetic path which is formed by magnetic poles which are not opposed to each other. In this arrangement, the magnetic flux density and the efficiency of generation of the Lorentz force by energization of the coil are low. In the oscillator disclosed in U.S. Pat. No. 5,718,418, the coil is disposed in a magnetic gap formed between two opposed magnetic poles. However, this oscillator has a problem relating to a structure for supporting the coil. That is, the coil supporting structure does not have a sufficiently large mechanical strength, resulting in difficulty to assure high degrees of operating stability and durability of the oscillator. If the number of windings of the coil is increased for the purpose of increasing the oscillating force, the magnetic gap is inevitably enlarged, causing a decrease in the magnetic flux density, resulting in difficulty to generate a sufficiently large amount of oscillating force.

SUMMARY OF THE INVENTION

It is therefore an object of this invention to provide a novel active damping oscillator which is capable of generating an oscillating force with high efficiency and stability.

The above object may be achieved according to the principle of the present invention, which provides an active damping oscillator comprising: (a) a shaft member; (b) an outer sleeve disposed radially outwardly and independently of the shaft member and axially movable relative to the shaft member; (c) a plurality of first magnetic pole portions disposed fixedly to one of the shaft member and the outer sleeve; (d) at least one permanent magnet associated with the first magnetic pole portions to give magnetic poles to the first magnetic pole portions; (e) a plurality of second magnetic pole portions disposed fixedly to the other of the shaft member and the outer sleeve; and (e) at least one coil associated with the second magnetic pole portions and energized to give magnetic poles to the second magnetic pole portions, and wherein the first magnetic pole portions and the second magnetic pole portions are opposed to each other in a radial direction of the shaft member with a predetermined radial gap therebetween, and are offset from each other in an axial direction of the shaft member such that the shaft member is held in a predetermined neutral axial position by first magnetic forces of the first magnetic pole portions which act between the first magnetic pole portions and the second magnetic pole portions, while the at least one coil is in a non-energized state, and such that the shaft member and the outer sleeve are moved relative to each other in the axial direction against the first magnetic forces by second magnetic forces which are generated upon energization of the at least one coil and which act between the first magnetic pole portions and the second magnetic pole portions.

In the active damping oscillator of the present invention constructed as described above, the shaft member and the outer sleeve are axially oscillated by the second magnetic forces generated by suitably energizing the at least one coil. The second magnetic forces consist of repellent forces and attractive forces acting between the magnetic poles of the first and second magnetic pole portions. Since the shaft member and the outer sleeve are disposed independently of each other without direct connection therebetween, the relative oscillation of the shaft member and the outer sleeve in the axial direction can be accurately controlled, with a comparatively high degree of linearity between the amount of electric current applied to the coil and the force of the oscillation, irrespective of the frequency of the oscillation. Thus, the present active damping oscillator is capable of dealing with vibrations over a wide range of frequency.

Unlike a conventional oscillator utilizing a Lorentz force, the present active damping oscillator has a unique arrangement which utilizes magnetic forces directly acting between the magnetic poles of the first magnetic pole portions and the magnetic poles of the second magnetic pole portions. In particular, the first and second magnetic pole portions, the at least one permanent magnet and the at least one coil are fixedly supported, with high strength and stability on the outer circumferential surface of the shaft member and the inner circumferential surface of the outer sleeve. Further, the utilization of the direct magnetic forces acting between the first and second magnetic pole portions makes it possible to provide a sufficiently large force of relative oscillation of the shaft member and the outer sleeve based on an operating principle similar to that of a linear motor. Accordingly, the present active damping oscillator has not only higher degrees of mechanical strength and durability, but also high degrees of efficiency and stability of generation of the oscillating force, than the conventional oscillator utilizing the Lorentz force.

According to one preferred form of this invention, the active damping oscillator further comprises a guide mechanism interposed between the shaft member and the outer sleeve, so as to permit a relative axial movement of the shaft member and the outer sleeve while preventing a relative radial movement thereof. The provision of this guide mechanism facilitates coaxial positioning of the shaft member and the outer sleeve while permitting the relative axial movement thereof, and permits accurate positioning of the first and second magnetic pole portions in the radial direction of the shaft member so as to maintain a predetermined small amount of radial gap between the first and second magnetic pole portions. Accordingly, the operation of the oscillator, more specifically, the relative axial oscillation of the shaft member and the outer sleeve is stabilized. The guide mechanism, which is interposed between the shaft member and the outer sleeve, may be at least one cylindrical slide sleeve, bushing or bearing made of a material having a sufficiently small sliding resistance. Alternatively, the guide mechanism may be at least one ball or roller bearing.

The first and second magnetic pole portions may be suitably designed and arranged so that the shaft member and the outer sleeve are placed in the predetermined neutral axial position by the first magnetic forces based on the permanent magnet or magnets, while the coil or coils is/are placed in the non-energized state, and such that the shaft member and the outer sleeve are axially moved relative to each other by the second magnetic forces generated when the coil or coils is/are energized. Both of the first magnetic pole portions and the second magnetic pole portions need not be parallel to the axial direction of the shaft member. That is, at least one of the surfaces of the first and second magnetic pole portions which are opposed to each other in the radial direction of the shaft member may be inclined relative to the axis of the shaft member or outer sleeve.

According to a second preferred form of this invention, the plurality of first magnetic pole portions are positioned relative to each other and relative to the plurality of second magnetic pole portions such that when the shaft member is placed in the predetermined neutral axial position, a center of at least one of the plurality of first magnetic pole portions as seen in the axial direction of the shaft member is aligned with a center of an axial distance between adjacent ones of the plurality of second magnetic pole portions as seen in the axial direction.

In one advantageous arrangement of the above second preferred form of the invention, each of the at least one of the plurality of first magnetic pole portions has an axial length which is larger than the axial distance between the adjacent ones of the plurality of second magnetic pole portions, each of the at least one of the plurality of first magnetic poler portions being positioned relative to the adjacent ones of the plurality of second magnetic pole portion in the axial direction such that opposite axial end portions of each of the at least one of the plurality of first magnetic pole portions are opposed to axial end portions of the adjacent ones of the plurality of second magnetic pole portions in the radial direction, with the predetermined radial gap therebetween. This arrangement of the first and second magnetic pole portions permits the shaft member to be held in and returned to the predetermined neutral axial position with improved stability and efficiency, and also permit the shaft member and the outer sleeve to be axially oscillated relative to the outer sleeve with improved stability and efficiency.

According to a third preferred form of this invention, the plurality of second magnetic pole portions are positioned relative to each other and relative to the plurality of first magnetic pole portions such that when the shaft member is placed in the predetermined neutral axial position, a center of at least one of the plurality of second magnetic pole portions as seen in the axial direction of the shaft member is aligned with a center of an axial distance between adjacent ones of the plurality of first magnetic pole portions as seen in the axial direction.

In one advantageous arrangement of the above third preferred form of the invention, each of the at least one of the plurality of second magnetic pole portions has an axial length which is larger than the axial distance between the adjacent ones of the plurality of first magnetic pole portions, each of the at least one of the plurality of second magnetic poler portions being positioned relative to the adjacent ones of the plurality of first magnetic pole portion in the axial direction such that opposite axial end portions of each of the at least one of the plurality of second magnetic pole portions are opposed to axial end portions of the adjacent ones of the plurality of first magnetic pole portions in the radial direction, with the predetermined radial gap therebetween. This arrangement of the first and second magnetic pole portions permits the shaft member to be held in and returned to the predetermined neutral axial position with improved stability and efficiency, and also permit the shaft member and the outer sleeve to be axially oscillated relative to the outer sleeve with improved stability and efficiency.

The first and second magnetic pole portions are made of suitable ferromagnetic materials. Some of these magnetic pole portions may consist of permanent magnets. The first magnetic pole portions are suitably arranged in relation to the at least one permanent magnet, while the second magnetic pole portions are suitably arranged in relation to the at least one coil. For instance, the According to a fourth preferred form of the active damping oscillator of the present invention, the plurality of first magnetic pole portions and the at least one permanent magnet are fixedly disposed on the shaft member such that each of the at least one permanent magnet is interposed between adjacent ones of the first magnetic pole portions, so that the adjacent ones of the first magnetic pole portions have opposite magnetic poles, while the plurality of second magnetic pole portions and the at least one coil are fixedly disposed on the outer sleeve such that each of the at least one coil is interposed between adjacent ones of the second magnetic pole portions, so that the adjacent ones of the second magnetic pole portions have opposite magnetic poles when each coil is energized.

According to a fifth preferred form of the active damping oscillator of this invention, the plurality of first magnetic pole portions and the at least one permanent magnet are fixedly disposed on the outer sleeve such that each of the at least one permanent magnet is interposed between adjacent ones of the first magnetic pole portions, so that the adjacent ones of the first magnetic pole portions have opposite magnetic poles, while the plurality of second magnetic pole portions and the at least one coil are fixedly disposed on the shaft member such that each of the at least one coil is interposed between adjacent ones of the second magnetic pole portions, so that the adjacent ones of the second magnetic pole portions have opposite magnetic poles when each coil is energized.

In the above fourth and fifth preferred forms of the active damping oscillator, the shaft member and the outer sleeve can be axially oscillated relative to each other, by a compact arrangement of the first and second magnetic pole portions, the at least one permanent magnet and the at least one coil.

According to a sixth preferred form of the active damping oscillator, each of the plurality of first magnetic pole portions is provided by one of a radially outer portion and a radially inner portion of an annular permanent magnet disposed fixedly to one of the shaft member and the outer sleeve, the radially inner and outer portions having opposite magnetic poles, the magnetic pole of the above-indicated one of the radially inner and outer portions of one of adjacent ones of the annular permanent magnets of the plurality of first magnetic pole portions being opposite to the magnetic pole of the above-indicated one of the radially inner and outer portions of the other of the adjacent ones of the annular permanent magnets.

The number of the first magnetic pole portions may be smaller by one than the number of the second magnetic pole portions, or vice versa. This arrangement is possible irrespective of whether the first magnetic pole portions are fixedly disposed on the shaft member or the outer sleeve. In this arrangement, each of the first magnetic pole portions whose number is smaller than that of the second magnetic pole portions may be aligned with the axial center of the axial distance between the adjacent ones of the second magnetic pole portions. Alternatively, each of the second magnetic pole portions whose number is smaller than that of the first magnetic pole portions may be aligned with the axial center of the axial distance between the adjacent ones of the first magnetic pole portions. These arrangements permit the shaft member to be held in and returned to the neutral axial position with improved stability and efficiency, and also permit the shaft member and the outer sleeve to be axially oscillated relative to each other with improved stability and efficiency.

Each of the first and second magnetic pole portions is preferably an annular member or portion fixedly mounted on the outer circumferential surface of the shaft member or fixedly disposed on the inner circumferential surface of the outer sleeve. However, each magnetic pole portion may be provided along a part of the circumference of the shaft member or outer sleeve, or may consist of a plurality of part-circumferential members or portions fixed on the shaft member or outer sleeve.

According to a seventh preferred form of this invention, the active damping oscillator further comprises a stop mechanism for defining a maximum amount of relative axial movement of the shaft member and the outer sleeve from the predetermined neutral axial position, so as to permit the shaft member to be returned to the neutral axial position after the maximum amount of relative axial movement. This stop mechanism prevents an excessive amount of relative axial movement of the shaft member and the outer sleeve, even when an excessively large load is applied between the shaft member and the outer sleeve. Accordingly, the stop mechanism permits the shaft member to be returned to the neutral axial position even when the oscillator receives such an excessively large load for some reason or other. Thus, the stop mechanism assures increased stability of operation of the oscillator, and therefore assures improved stability of active vibration damping characteristics. The stop mechanism preferably includes a shock absorbing member such as a rubber or any other elastic member which is interposed between selected parts of the shaft member and the outer sleeve which are opposed to each other in the axial direction and are normally spaced apart from each other in the axial direction. In this case, the selected parts of the shaft member and the outer sleeve are adapted to abut on each other through the elastic member in a shock absorbing fashion when the amount of relative axial displacement of the shaft member and the outer sleeve exceeds a given limit.

The active damping oscillator according to the present invention may be used in association with a vibrating member whose vibration is to be damped, for example, such that the shaft member is held stationary while the outer sleeve is movable, or vice versa. However, it is preferable that one of the shaft member and the outer sleeve to which the at least one coil is fixed be held stationary so that the at least one coil is held stationary. This arrangement assures increased durability of a power supply system for energizing the at least one coil, and permits utilization of the weight or mass of at least one permanent magnet to increase the mass of the movable member (the other of the shaft member and the outer sleeve) which is axially oscillated relative to the stationary member (the above-indicated one of the shaft member and the outer sleeve).

The present active damping oscillator may be used directly for actively damping the vibration of a vibrating member, like a vibration damper as disclosed in JP-A-6-235438. In this case, one of the shaft member and the outer sleeve is attached to a vibrating member whose vibration is to be damped, for instance. However, the present oscillator may suitably used in combination with a vibration damping device which includes an elastic body, for example. For instance, the present oscillator may be used in combination with a fluid-filled vibration damping mount, for providing an active vibration damping effect by controlling the pressure of a fluid in a fluid chamber, as disclosed in JP-B2-2510914 and JP-B2-2510915. Described more particularly, the fluid-filled vibration damping mount disclosed in these publications includes a first mounting member and a second mounting member which are elastically connected to each other by an elastic body, which partially defines a pressure-receiving chamber which is filled with a non-compressible fluid and which is partially defined by a movable oscillating plate. The present active damping oscillator is attached to the fluid-filled vibration damping mount such that one of the shaft member and the outer sleeve is fixed to one of the second mounting member while the other of the shaft member and the outer sleeve is fixed to the oscillating plate, so that the movable oscillating plate is oscillated by the relative axial oscillation of the shaft member and the outer sleeve by energization of the at least one coil, so as to cause a change in the fluid pressure in the pressure-receiving chamber, for thereby actively damping the input vibration applied between the first and second mounting members of the fluid-filled vibration damping mount.

In the present active damping oscillator, the frequency and amplitude of the control signal for energizing each coil are controlled to control the frequency and amplitude of relative axial oscillation of the shaft member and the outer sleeve. In this respect, it is desirable to use a controller which is adapted to control the energization of each coil such that the frequency and the phase of the relative axial oscillation are the same as those of the input vibration to be damped. For instance, the controller may be adapted to receive signals indicative of the characteristics of the vibration to be damped, so that the energization of each coil is controlled depending upon those signals, so as to reduce the amplitude of the input vibration. To this end, the controller may be designed to control the energization of each coil, in a generally known feedback or adaptive control fashion such as a PI (proportioning and integral) control, or according to a suitable control program without a feedback compensation.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
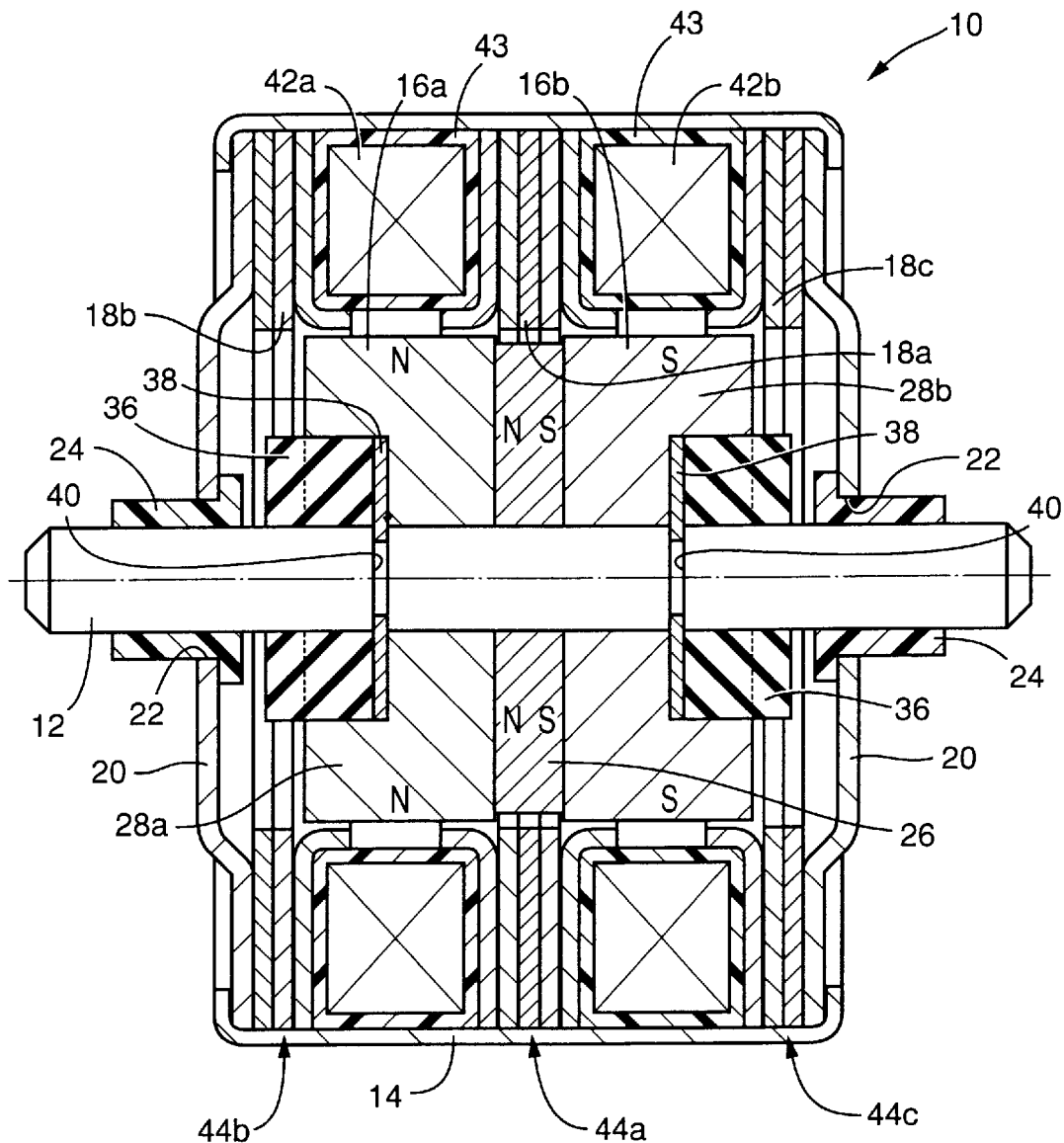
FIG. 1 is an elevational view in longitudinal cross section of an active damping oscillator constructed according to one embodiment of this invention.

Referring first to FIG. 1, an active damping oscillator constructed according to a first embodiment of this invention is shown generally at 10. This active damping oscillator 10 includes an shaft member 12 and an outer sleeve 14 which are disposed coaxially with each other with a suitable radial spacing therebetween. As described below in detail, the inner shaft member 12 is axially reciprocated, namely, oscillated relative to the outer sleeve 14, by a magnetic force acting between first magnetic pole portions in the form of two inner magnetic pole portions 16a, 16b provided on the shaft member 12 and second magnetic pole portions in the form of three outer magnetic pole portions 18a, 18b, 18c.

The inner shaft member 12 is a solid rod having a circular cross sectional shape made of a metallic material. The shaft member 12 is desirably made of a non-magnetic material. The outer sleeve 14 is a thin-walled cylindrical member having a considerably larger diameter than the shaft member 12, and is disposed coaxially with and radially outwardly of the shaft member 12. Two substantially annular cap members 20 are disposed so as to close opposite axial open ends of the outer sleeve 14. That is, the outer sleeve 14 has inward flanges extending radially inwardly from its opposite axial open ends. These inward flanges fixedly engage the respective cap members 20. Each of the cap members 20 has a center hole 22 in which a slide sleeve 24 is press-fitted, and suitably secured to the cap member 22 as needed, by a bonding adhesive, for example. The slide sleeve 24 is a porous metal, which is impregnated with a suitable synthetic resin such as polyfluoroethylene, or a suitable lubricating agent, so that the inner circumferential surface serves as a sliding surface having a low friction coefficient.

The inner shaft member 12 is disposed so as to extend through the two slide sleeves 24, so that the shaft member 12 is axially slidable relative to the slide sleeves 24 and the cap members 20. Thus, the shaft member 12 and the outer sleeve 14 are axially movable relative to each other, while being guided by the slide sleeves 24 so as to prevent a relative radial displacement between the shaft member 12 and the outer sleeve 14. It will be understood that the slide sleeves 24 serve as a guide mechanism for guiding the shaft member 12 so as to assure a smooth relative axial movement of the shaft member 12 and the outer sleeve 14. It will also be understood that the shaft member 12 and the outer sleeve 14 are not directly connected to each other by a rubber member or any other elastic member, and are disposed independently of each other so as to be freely movable relative to each other in their axial direction. The shaft member 12 has a larger axial dimension than the outer sleeve 14, so that the opposite end portions of the shaft member 12 which project from the outer end of each slide sleeve 24 are suitably guided by the slide sleeves 24 even when the the shaft member 12 is axially moved relative to the outer sleeve 14 by a maximum distance, which is determined by a stop mechanism described below.

An annular permanent magnet 26 is fixedly mounted on an axially intermediate portion of the shaft member 12. Further, two annular inner yoke members 28a, 28b are fixedly mounted on respective axial portions of the shaft member 12 which are adjacent to the intermediate portion indicated above. These inner yoke members 28a, 28b are fixed to the opposite surfaces of the permanent magnet 26, and are made of a ferromagnetic material. The inner yoke members 28a, 28b have a larger outside diameter than the permanent magnet 26, and has the respective inner magnetic pole portions 16a, 16b which serve as the first magnetic pole portions. That is, the radially outer peripheral portions of the two inner yoke members 28a, 28b which radially outwardly project from the outer circumferential surface of the permanent magnet 26 serve as the two inner magnetic pole portions 16a, 16b which are spaced apart from each other in the axial direction of the inner yoke members 28a, 28b.

Each of the two inner yoke members 28a, 28b has an annular recess in one of its opposite surfaces which is remote from the permanent magnet 26. This annular recess is concentric with the inner yoke member 28a, 28b, and accommodates a part of an annular rubber stop member 36, which has a ring 38 bonded to its inner surface. The ring 38 is held in engagement with an annular groove 40 formed in the outer circumferential surface of the shaft member 12, so that the stop member 36 is fixed to the shaft member 12. The annular stop member 36 has an axial part which projects from the above-indicated recess, that is, from the outer surface of the inner yoke member 28a, 28b remote from the permanent magnet 26. The above-indicated axial part of the stop member 36 is opposed to the inner end face of the corresponding slide sleeve 24. The axial dimension of the stop member 36 is determined so that the above-indicated axial part is spaced part from the slide sleeve 24 by a predetermined distance in the axial direction of the shaft member 12. This distance determines the above-indicated maximum distance of the relative axial movement or displacement of the shaft member 12 and the outer sleeve 14. That is, abutting contacts of the rubber stop members 36 with the respective slide sleeves 24 in a shock absorbing fashion limit the distance of the relative axial movements of the shaft member 12 and the outer sleeve 14. It will be understood that the cap members 20, slide sleeves 24 and stop members 36 constitute a stop mechanism for limiting the relative axial movements of the shaft member 12 and the outer sleeve 14 in a shock absorbing fashion.

Figure 2:
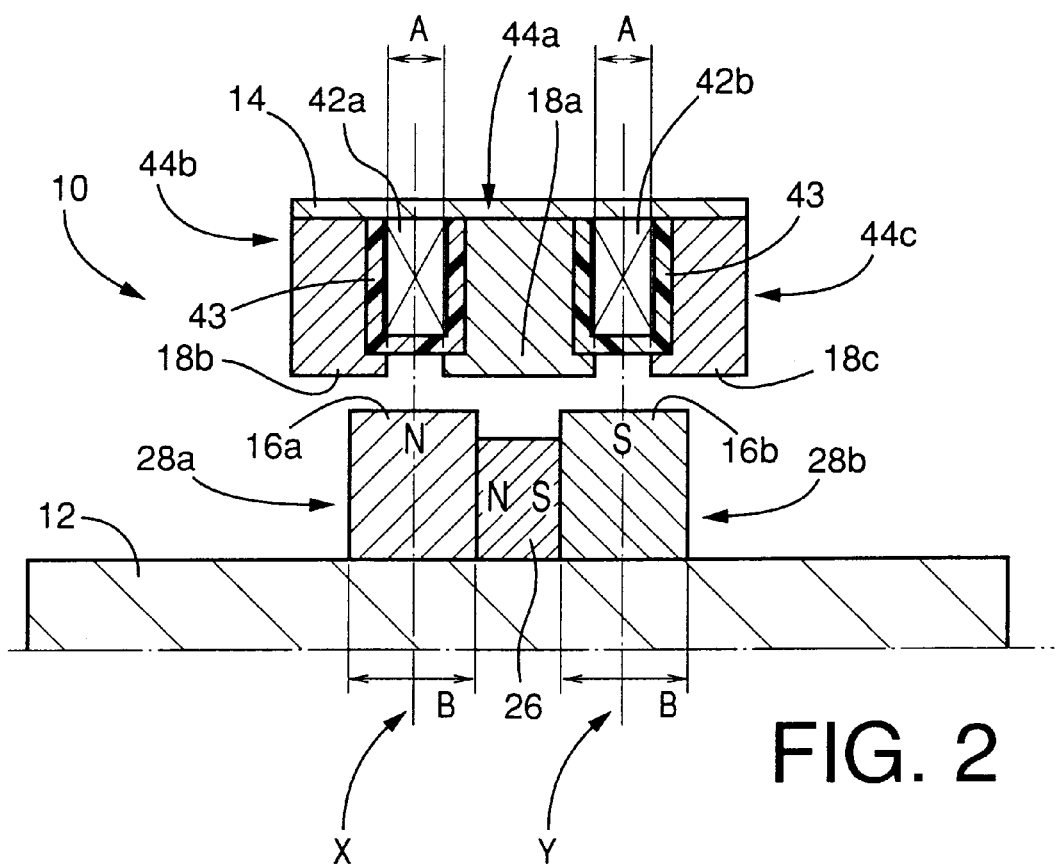
FIG. 2 is a cross sectional view schematically illustrating a basic structure of the active damping oscillator of FIG. 1.

As schematically illustrated in FIG. 2, the permanent magnet 26 fixed mounted on the shaft member 12 has opposite magnetic poles N and S at its axial opposite ends. That is, the magnetic pole N is located at its axial end on the side of the left inner yoke member 28a, so that the left inner magnetic pole portion 16a provided on the left inner yoke member 28a has a magnetic pole N, while the magnetic pole S is located at its axial end on the side of the right inner yoke member 28b, so that the right inner magnetic pole portion 16b provided on the right inner yoke member 28b has a magnetic pole S.

On the other hand, two annular coils 42a, 42b are fixed to the inner circumferential surface of the outer sleeve 14 such that the two coils 42a, 42b are spaced apart from each other in the axial direction. Each of these coils 42a, 42b is covered by an electrically insulating bobbin 43. Further, three annular outer yoke members 44a, 44b, 44c are disposed arranged such that the intermediate outer yoke member 44a is interposed between the two coils 42a, 42b while the left and right outer yoke members 44b and 44c are disposed adjacent the coils 42a, 42b, respectively. Each of these outer yoke members 44a, 44b, 44c consists of a plurality of relatively thin annular rings made of a ferromagnetic material and superposed on each other. The three outer yoke members 44a, 44b, 44c are fixed to the outer sleeve 14, together with the coils 42a, 42b. The outer yoke members 44a, 44b, 44c have a small inside diameter than the coils 42a, 42b, and have the respective outer magnetic pole portions 18a, 18b, 18c which serve as the second magnetic pole portions. That is, the radially inner peripheral portions of the three inner yoke members 44a, 44b, 44c which radially inward project from the inner circumferential surface of the coils 42a, 42b serve as the three outer magnetic pole portions 18a, 18b, 18c which are spaced apart from each other in the axial direction of the outer yoke members 44a, 44b, 44b.

Upon application of an electric current to the coils 42a, 42b through lead wires (not shown), magnetic fields are produced, and the coils 42a, 42b function as electromagnets, so that the outer yoke members 44a, 44b, 44c and the outer magnetic pole portions 18a, 18b, 18c are given magnetic poles depending upon the directions of flows of the electric current through the coils 42a, 42b. In the present embodiment, the electric current is applied to the two coils 42a, 42b such that the electric current flows through the coils 42a, 42b in the opposite directions. In this arrangement, the magnetic pole given to the intermediate outer magnetic pole portion 18a provided on the intermediate outer yoke member 44a interposed between the two coils 42a, 42b is opposite to the magnetic pole given to the right and left outer magnetic pole portions 18b, 18c provided on the respective right and left outer yoke members 44b, 44c which are superposed on the annular surfaces of the coils 42a, 42b which are remote from the intermediate outer yoke member 44a.

The outer magnetic pole portions 18a, 18b, 18c located on the side of the outer sleeve 14 are opposed in the radial direction to the inner magnetic pole portions 16a, 16b located on the side of the shaft member 12, with a predetermined small radial gap therebetween in the radial direction of the shaft member 12 and the outer sleeve 14. The inner magnetic pole portions 16a, 16b are axially positioned relative to the outer magnetic pole portions 18a, 18b, 18c such that when the shaft member 12 is placed in a predetermined neutral axial position of FIG. 2 relative to the outer sleeve 14, a centerline X perpendicular to the axis of the shaft member 12 and passing an axially center point of the left inner magnetic pole portion 16a passes an axially center point of the left coil 42a, which is axially intermediate between the intermediate and left outer magnetic pole portions 18a and 18b, while a centerline Y perpendicular to the axis of the shaft member 12 and passing an axially center point of the right inner magnetic pole portion 16b passes an axially center point of the right coil 42b, which is axially intermediate between the intermediate and right outer magnetic pole portions 18a, 18c. Further, each of the inner magnetic pole portions 16a, 16b has an axial length B which is larger than an axial distance A between the two adjacent inner magnetic pole portions 18a and 18b, or 18a and 18c. The inner magnetic pole portions 16a, 16b are axially positioned relative to the outer magnetic pole portions 18a, 18b, 18c such that when the shaft member 12 is placed in the neutral position, the opposite axial end portions of each inner magnetic pole portion 16a, 16b are opposed to the end portions of the adjacent outer magnetic pole portions 18a and 18b, or 18a and 18c, in the radial direction, and such that the outer circumferential surfaces of the inner magnetic pole portions 16a, 16b are parallel with the inner circumferential surfaces of the outer magnetic pole portions 18a, 18b, 18c.

Thus, the inner magnetic pole portions 16a, 16b are offset with respect to the outer magnetic pole portions 18a, 18b, 18c in the axial direction of the shaft member 12 when the shaft member 12 is placed in the neutral position relative to the outer sleeve 14.

It will be understood from the foregoing description of the present first embodiment that it is preferred that the inner yoke members 28a, 28b and the outer yoke members 44a, 44b, 44c are made of an iron or other ferromagnetic material, while the cap members 20 are made of aluminum or other non-magnetic material. Further, it is preferred that the shaft member 12 on which the permanent magnet 26 is mounted is made of a non-magnetic material while the outer sleeve 14 to which the coils 42a, 42b are fixed is made of a ferromagnetic material.

There will next be described an operation of the present active damping oscillator 10 constructed as described above. While the coils 42a, 42b are placed in a non-energized state, the central and right and left outer magnetic pole portions 18a, 18b, 18c are not given magnetic poles, and the shaft member 12 and the outer sleeve 14 are held in the predetermined neutral axial position of FIG. 2 by a holding force, more specifically, by equilibrium between a first magnetic force acting between the left inner magnetic pole portion 16a and the intermediate and left outer magnetic pole portions 18a, 18b based on the magnetic pole N of the left inner magnetic pole portion 28a, and a first magnetic force acting between the right inner magnetic pole portion 16b and the intermediate and right outer magnetic pole portions 18a, 18c based on the magnetic pole S of the right inner magnetic pole portion 16b. If the equilibrium is lost due to a relative axial movement of the shaft member 12 and the outer sleeve 14 from the neutral position while the coils 42a, 42b are in the non-energized state, the shaft member 12 and the outer sleeve 14 are returned to the neutral position for restoring the equilibrium. In the absence of the stop mechanism including the rubber stop members 36, 36 described above, the amount of the relative axial movement of the shaft member 12 and the outer sleeve 14 would exceed a value above which the shaft member 12 and the other sleeve 14 cannot be returned to their neutral position by the first magnetic forces indicated above. In other words, such an excessive amount of relative axial movement of the shaft member 12 and the outer sleeve 14 is prevented by the stop mechanism in the present active damping oscillator 10, assuring high stability of returning of the shaft member 12 and the outer sleeve 14 to their neutral position by the first magnetic forces based on the magnetic poles N and S of the inner magnetic pole portions 16a, 16b.

Figure 3:
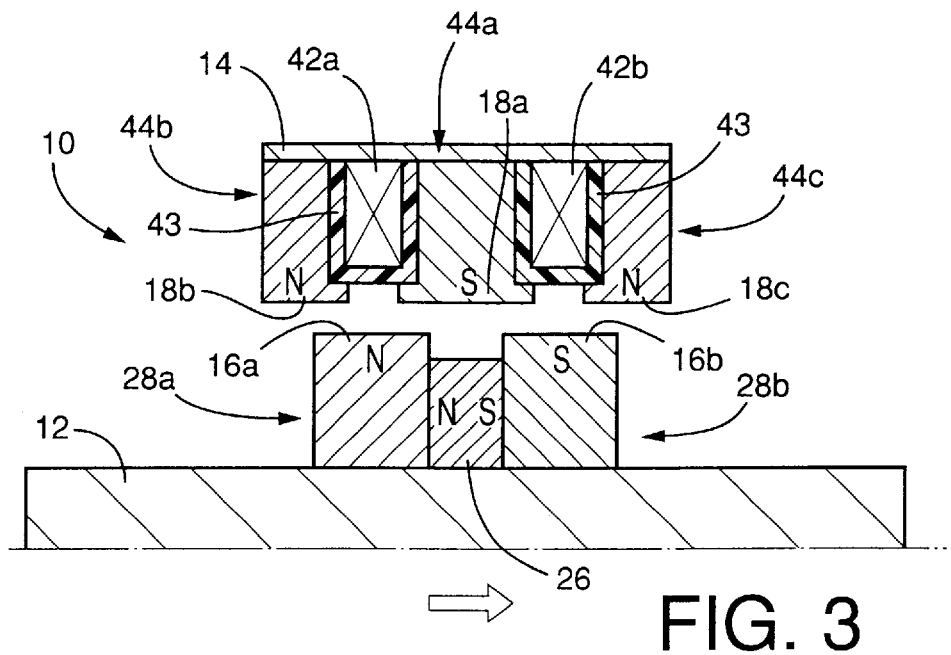
FIG. 3 is a cross sectional view for explaining an operating state of the active damping oscillator of FIG. 1.

When the coils 42a, 42b are energized, they function as electromagnets. In the present embodiment, the coils 42a, 42b are energized in the opposite directions. That is, the directions in which the electric current flows through the coils 42a, 42b are opposite to each other, so that the intermediate outer magnetic pole portion 18a is given a magnetic pole S while the right and left outer magnetic pole portions 18b and 18c are given magnetic poles N, as indicated in FIG. 3, by way of example. As a result, the shaft member 12 and the outer sleeve 14 are axially moved relative to each other, against the first magnetic forces, that is, the shaft member 12 is moved relative to the outer sleeve 14 in the right direction as indicated by an arrow in FIG. 3, against the first magnetic forces based on the permanent magnet 26, by second magnetic forces generated by energization of the coils 42a, 42b. The second magnetic forces consist of repellent forces acting between the same magnetic poles (poles N of the left inner and outer magnetic pole portions 16a, 18b, and poles S of the left inner and intermediate outer magnetic poles 16b, 18a), and attractive forces acting between the opposite magnetic poles (magnetic pole N of the right inner magnetic pole 16a and magnetic pole S of the intermediate outer magnetic pole 18a, and magnetic pole S of the right inner magnetic pole 16b and magnetic pole N of the right outer magnetic pole 18c). The above-indicated equilibrium of the first magnetic forces based on the permanent magnet 26 are overcome by the second magnetic forces in the form of the repellent and attractive forces generated by energization of the coils 42a, 42b.

Figure 4:
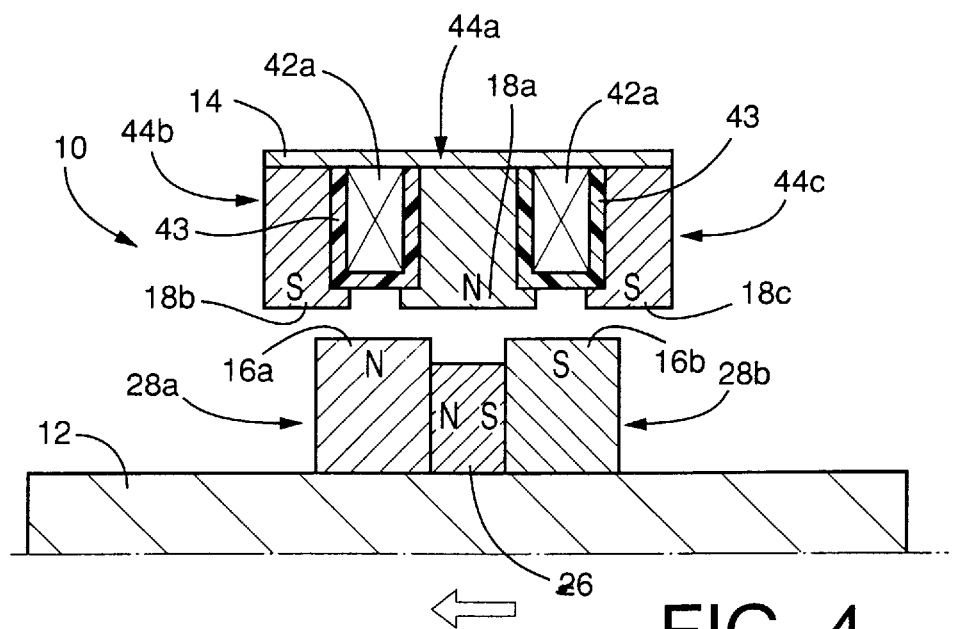
FIG. 4 is a cross sectional view for explaining another operating state of the active damping oscillator of FIG. 1.

After the shaft member 12 has been moved relative to the outer sleeve 14 to a given position in the right direction, the direction of energization of each of the coils 42a, 42b is reversed, so that the magnetic poles of each energized coil functioning as an electromagnet are reversed, namely, the intermediate outer magnetic pole portion 18a is given the magnetic pole N while the right and left outer magnetic pole portions 18b, 18c are given the magnetic poles S, as indicated in FIG. 4. As a result, the shaft member 12 is moved relative to the outer sleeve 14 in the left direction as indicated by an arrow in FIG. 4, by the repellent forces acting between the same magnetic poles and the attractive forces acting between the opposite magnetic poles.

The coils 42a, 42b may be energized by application of an alternating or pulsating current, or alternately energized and de-energized, so as to axially oscillate the shaft member 12 relative to the outer sleeve 14. As described below by reference to FIG. 5, the shaft member 12 is attached to a fluid-filled vibration damping device while the outer sleeve 14 is attached to a member to which the damping device is fixed, so that a reaction force of an oscillating force for oscillating the shaft member 12 relative to the outer sleeve 14 is applied to the above-indicated member to which the damping device is fixed. For instance, the present active damping oscillator 10 is used with an active vibration damping device as disclosed in JP-A-6-235438 or an active vibration damping mount as disclosed in JP-A-5-149369, such that one of the shaft member 12 and the outer sleeve 14 is attached to a vibrating member whose vibration is to be damped, or an appropriate member of a vibration transmitting system through which the vibration of the vibrating member is transmitted. The coils 42a, 42b are energized according to a control signal depending upon the frequency, amplitude and phase of the vibration to be damped, so that the active vibration damping device or mount with the active vibration oscillator 10 exhibits a high active damping effect with respect to the vibration having the specific characteristics.

In the present active damping oscillator 10, the shaft member 12 and the outer sleeve 14 which are displaced relative to each other are not elastically connected to each other by an elastic member, but are disposed independently of each other. This arrangement makes it possible to control the oscillating force acting between the shaft member 12 and the outer sleeve 14, with improved response and high degree of linearity with respect to the control signal for energizing the coils 42a, 42b. Described more specifically, the elimination of a rubber member, coil spring or any other elastic member for directly and elastically connecting the shaft member 12 and the outer sleeve 14 is effective to restrict a resonance action of the active damping oscillator 10 in a specific frequency range of the vibration to be damped. Accordingly, the present active damping oscillator 10 does not suffer from abrupt changes in the phase and amplitude of the oscillating force, which would otherwise occur due to such a resonance action in the specific frequency range of the vibration. Hence, the active damping oscillator 10 permits the active vibration damping device or mount to exhibit a high active damping effect with high stability, with respect to vibrations over a wide range of frequency, from low-frequency vibrations to high-frequency vibrations, by controlling the coils 42a, 42b according to a suitable control program, without feedback compensation.

Figure 5:
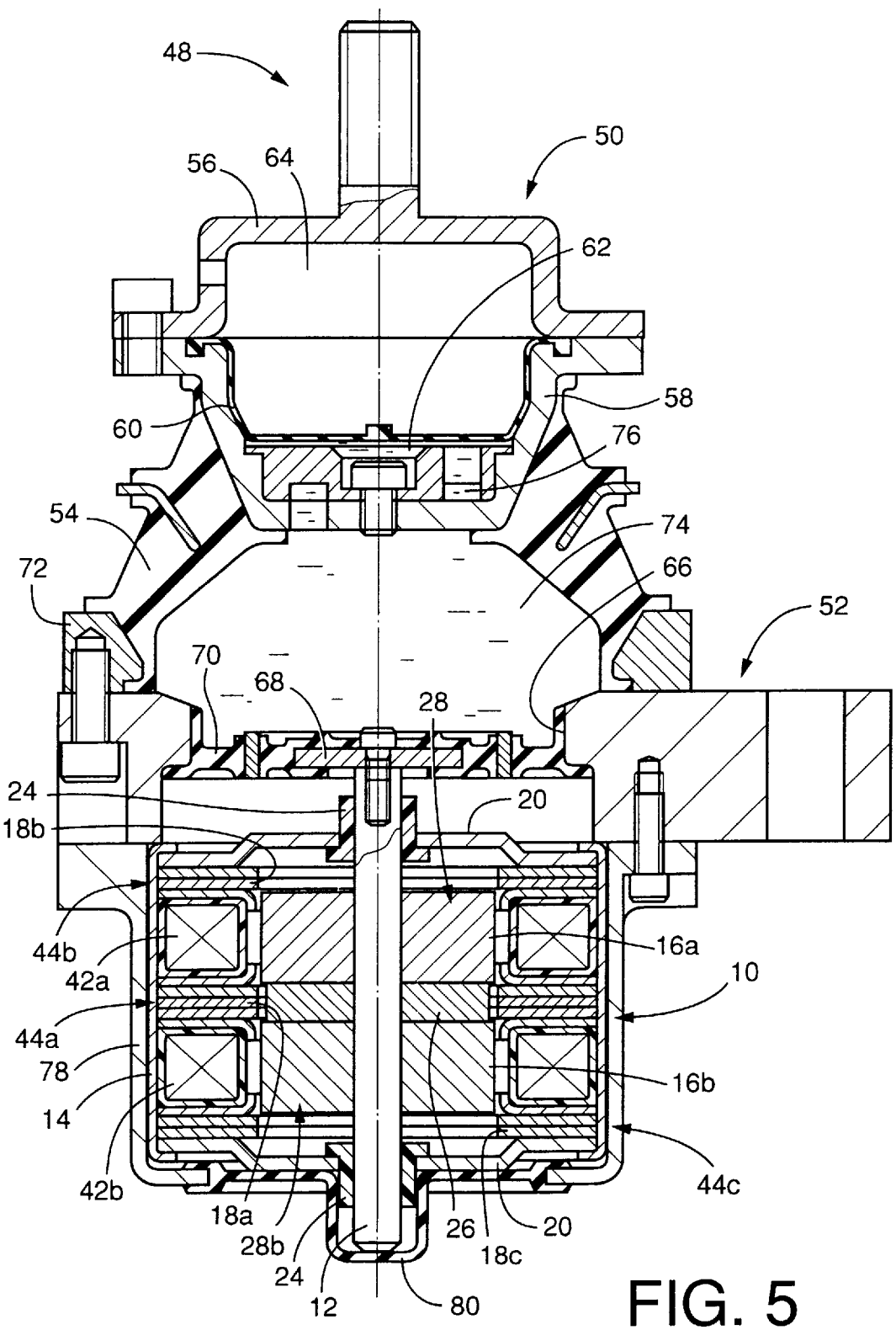
FIG. 5 is an elevational view in axial cross section showing the active damping oscillator of FIG. 1 as attached to a fluid-filled elastic mount.

Referring next to FIG. 5, there will be described an example of application of the active damping oscillator 10 to a fluid-filled vibration damping mount in the form of an engine mount 48 for an automotive vehicle. The engine mount 48 includes a first mounting member 50 and a second mounting member 52 which are made of metallic materials. These first and second mounting members 50, 52 are connected to each other by an elastic body 54 made of a rubber material, and are spaced apart from each other by the elastic body 54. The first mounting member 50 is bolted to a power unit of the vehicle, which includes an engine, while the second mounting member 52 is bolted to the vehicle body. Thus, the power unit is mounted on the vehicle body through the engine mount 48 in a vibration damping fashion.

The engine mount 48 has a basic construction as well known in the art, for instance, as disclosed in JP-A-5-149369. Briefly described, the first mounting member 50 consists of an upper member 56 and a lower member 58 which are generally cut-shaped and have outward flanges at their openings. These cup-shaped upper and lower members 56, 58 are butted and fixed together at their outward flanges so as to form a hollow structure. The interior of the hollow first mounting member 50 is fluid-tightly divided by a flexible diaphragm 60 into a variable-volume equilibrium chamber 62, and an air chamber 64 which permits elastic deformation or displacement of the flexible diaphragm 60. The equilibrium chamber 62 is filled with a suitable non-compressible fluid.

On the other hand, the second mounting member 52 is a generally annular member which is disposed substantially coaxially with the first mounting member 50, and in an axially spaced-apart relationship with the first mounting member 50. The second mounting member 52 has a bore 66 in which there is disposed a rigid movable plate 68, which is elastically supported by an annular rubber support 70 bonded to the inner circumferential surface of the bore 66. In other words, the movable plate 68 is supported by the second mounting member 52 through the rubber support 70 such that the movable plate 68 is movable in the axial direction of the engine mount 48. Thus, the bore 66 is fluid-tightly closed by the elastic support 70 and the movable plate 68.

The elastic body 54 elastically connecting the first and second mounting members 50, 52 is a generally frustoconical member having a relatively large recess open in its large-diameter end face (lower end face as seen in FIG. 5), so that the elastic body 54 has a relatively large wall thickness. In the process of vulcanization of a rubber member to form the elastic body 54, the elastic body 54 is bonded at its small-diameter end to the first mounting member 50, and at its large-diameter end to a connector ring 72 made of a metallic material. The connector ring 62 is bolted to the second mounting member 52. In the present engine mount 48, the elastic body 54 cooperates with the first and second mounting members 50, 52, movable plate 68 and rubber support 70 to define a pressure-receiving chamber 74 filled with the non-compressible fluid. This pressure-receiving chamber 74 is held in communication with the equilibrium chamber 62 through an orifice passage 76 formed through the first mounting member 50.

When an input vibration is applied between the first and second mounting members 50, 52, there is induced a difference between the pressures of the non-compressible fluid in the equilibrium and pressure-receiving chambers 63, 74, so that the fluid is forced to flow through the orifice passage 76. Based on the fluid flows through the orifice passage 76 or resonance of the fluid flowing therethrough, the engine mount 48 exhibits a damping effect with respect to shaking vibrations, and an isolating effect with respect to engine idling vibrations, for example.

The active damping oscillator 10 is attached to the engine mount 48, such that the outer sleeve 14 is bolted to the second mounting member 52 through a cylindrical metal casing 78, while the shaft member 12 is bolted at one of its opposite ends to the movable plate 58. The outer sleeve 14 is press-fitted in the metal casing 78, which is bolted to the underside of the second mounting member 52. With the oscillator 10 thus bolted to the engine mount 48, the axis of the shaft member 12 is aligned with the center of the annular movable plate 68. The casing 78 is desirably made of a non-magnetic material. The lower opening of the cylindrical casing 78 is closed by a deformable or flexible dust cover 80.

In the active damping oscillator 10 attached to the engine mount 48 as described above, the shaft member 12 is held in the neutral position by an elastic force generated by the rubber support 70, which partially defines the pressure-receiving chamber 74. That is, the shaft member 12 is supported by the movable plate 68 such that the shaft member 12 is held in its neutral position by equilibrium between a downward force due to the gravity acting on the shaft member 12 and an upward force generated by the rubber support 70 due to a reaction force of the downward force acting on the rubber support 70 through the movable plate 68. Thus, the shaft member 12 is held in the neutral position, even if the first magnetic forces based on the permanent magnet 26 are absent, and even where the engine mount 10 is oriented such that the axis of the oscillator 10 extends in the vertical direction. This arrangement permits efficient oscillation of the shaft member 12 relative to the outer sleeve 14 by energization of the coils 42a, 42b as described above.

In operation of the fluid-filled active damping engine mount 48 equipped with the active damping oscillator 10, a controlled alternating current is applied to the coils 42a, 42b, so as to oscillate the shaft member 12 in the axial direction relative to the outer sleeve 14, so that an oscillating force for oscillating the shaft member 12 acts between the second mounting member 52 and the movable plate 68, whereby the movable plate 68 is oscillated in the axial direction of the engine mount 48, so as to periodically change the fluid pressure in the pressure-receiving chamber 74. Thus, the oscillating force of the shaft member 12 is transmitted to the vehicle body through the fluid in the pressure-receiving chamber 74, so that the engine mount 48 is capable of actively damping or isolating the input vibration, depending upon the characteristics of the input vibration.

As described above, the active damping oscillator 10 does not use an elastic member connecting the shaft member 12 and the outer sleeve 14 which are axially displaced relative to each other to oscillate the movable plate 68. In the absence of such an elastic member in a system for producing the oscillating force, the active damping oscillator 10 does not suffer from a resonance action in a specific frequency range of the vibration to be damped, which would cause abrupt changes in the phase and amplitude of the oscillating force, when the frequency of the vibration to be damped is in the specific frequency range. Hence, the active damping oscillator 10 permits relatively easy tuning of the vibration damping characteristics of the fluid-filled engine mount 48. Although the engine mount 48 per se may have a specific frequency vibration frequency characteristic determined by a resonance action due to the use of the elastic body 54 and the rubber support 70 which partially define the pressure-receiving chamber 74, the vibration damping characteristics of the engine mount 48 can be easily tuned or adjusted by suitably controlling the energization of the coils 42a, 42b of the oscillator 10, which does not suffer from an undesirable resonance action due to the use of an elastic member elastically connecting the shaft member 12 and the outer sleeve 14.

While the active damping oscillator 10 according to the first embodiment of this invention has been described above, the present invention may be otherwise embodied.

For instance, the present invention may be embodied as shown in FIGS. 6–9. The same reference numerals as used in the first embodiment will be used in FIGS. 6–9 to identify the functionally corresponding elements. In the interest of simplification, redundant description of these elements will not be provided.

Figure 6:
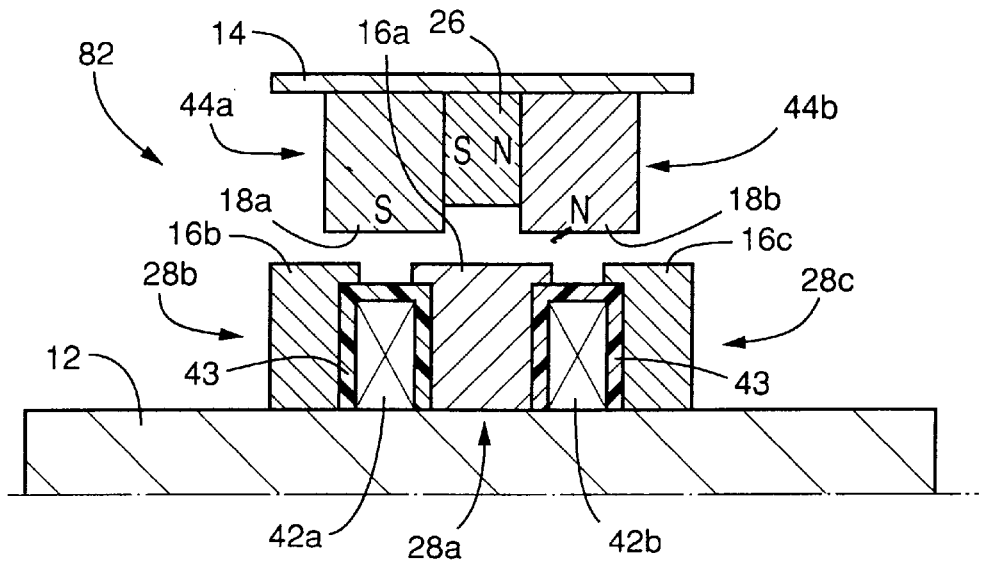
FIG. 6 is a cross sectional view corresponding to that of FIG. 2, showing an active damping oscillator according to a second embodiment of the present invention.

In an active damping oscillator 82 according to a second embodiment of the invention shown in FIG. 6, the permanent magnet 26 is interposed between the two outer yoke members 44a, 44b fixed to the outer sleeve 14, while each of the coils 42a, 42b is interposed between adjacent ones of three inner yoke members 28a, 28b, 29c which are fixed to the shaft member 12. More specifically described, the coil 42a is interposed between the intermediate and left inner yoke member 28a, 28b, while the coil 42b is interposed between the intermediate and right inner yoke members 28a, 28c. Unlike the active damping oscillator 10 of the first embodiment, the active damping oscillator 82 of this second embodiment of FIG. 6 has the first magnetic pole portions in the form of the two outer magnetic pole portions 18a, 18b which are given magnetic poles by the permanent magnet 26 which is fixed to the outer sleeve 14. Further, the oscillator 82 has the second magnetic pole portions in the form of the three inner magnetic pole portions 16a, 16b, 16c which are given magnetic poles by energization of the coils 42a, 42b which are mounted on the shaft member 12.

Figure 7:
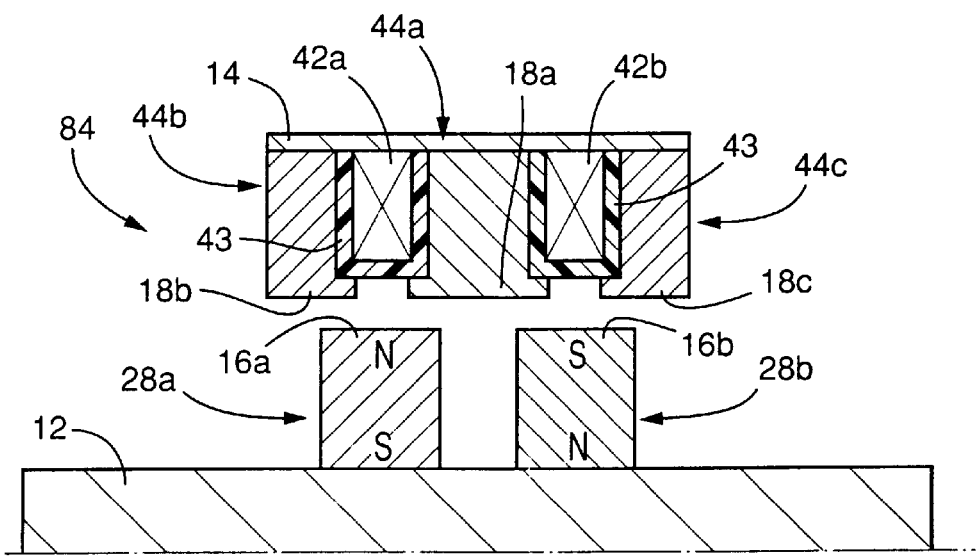
FIG. 7 is a cross sectional view corresponding to that of FIG. 2, showing an active damping oscillator according to a third embodiment of the invention.

An active damping oscillator 84 according to a third embodiment of this invention shown in FIG. 7 is different from the oscillator 10 of the first embodiment, in that the permanent magnet 26 is not interposed between the two inner yoke members 28a, 28b, while these inner yoke members 28a, 28b are constituted by respective permanent magnets having magnetic poles N and S at their radially outer and inner portions which serve as the inner magnetic pole portions 16a, 16b. In this oscillator 84, it is preferable to form the shaft member 12 of a ferromagnetic material, for effectively utilizing the first magnetic forces generated by the inner magnetic pole portions 16a, 16b constituted by the permanent magnets 26a, 26b.

Figure 8:
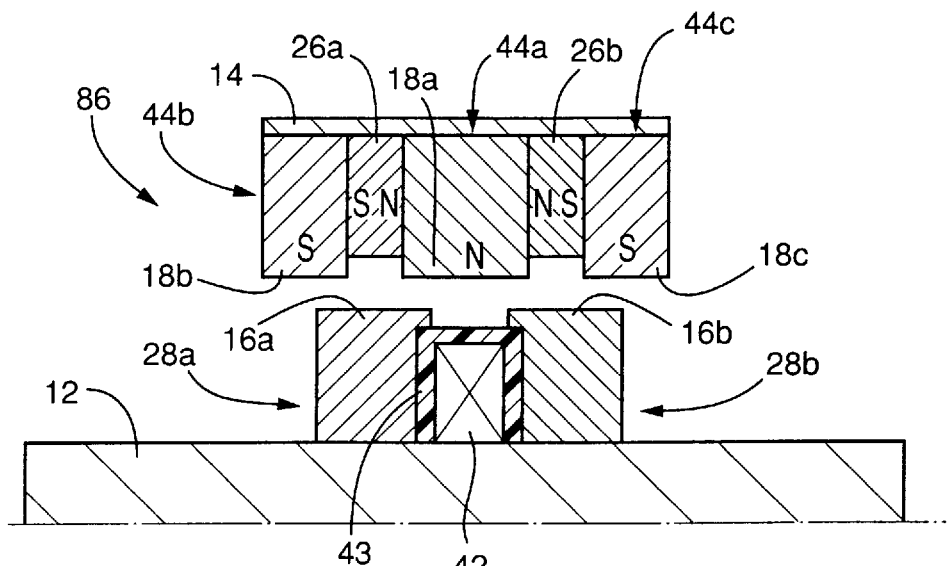
FIG. 8 is a cross sectional view corresponding to that of FIG. 2, showing an active damping oscillator according to a fourth embodiment of the invention.

An active damping oscillator 84 according to a fourth embodiment of this invention shown in FIG. 8 is different from the oscillator 10 of the first embodiment, in that the coil 42 rather than the permanent magnet 26 is interposed between the two inner yoke members 28a, 28b, while two permanent magnets 26a, 26b rather than each of the coils 42a, 42b is interposed between adjacent ones of the three outer yoke members 44a, 44b, 44c. In this oscillator 86, the first magnetic pole portions in the form of the three outer magnetic pole portions 18a, 18b formed by the outer yoke members 44a, 44b is given the magnetic poles N, S by the permanent magnets 26a, 26b fixed to the outer sleeve 14, while the second magnetic pole portions in the form of the two inner magnetic pole portions 16a, 16b formed by the inner yoke portions 28a, 28b is given the magnetic poles N, S by energization of the single coil 42 mounted on the shaft member 12.

Figure 9:
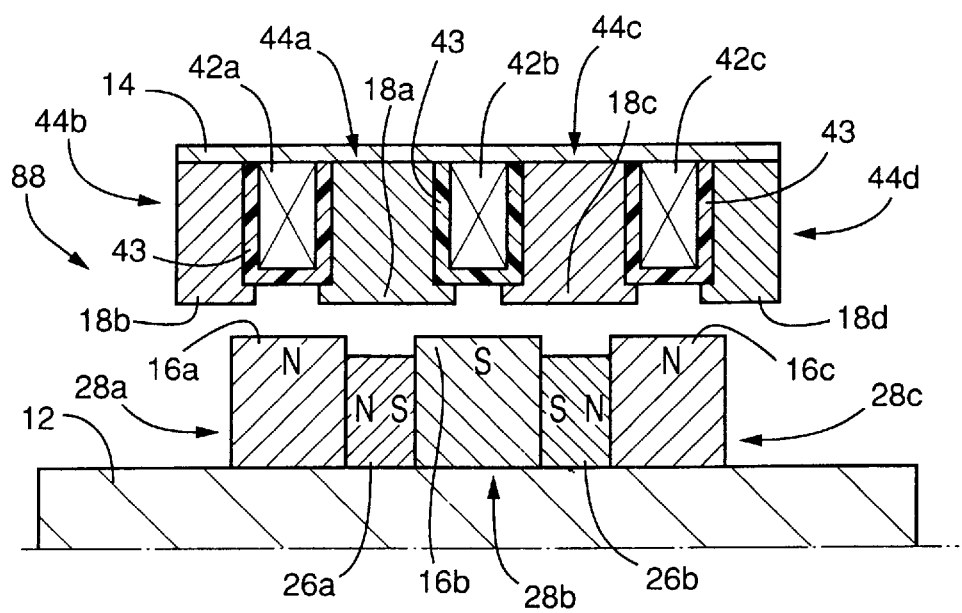
FIG. 9 is a cross sectional view corresponding to that of FIG. 2, showing an active damping oscillator according to a fifth embodiment of the invention.

An active damping oscillator 88 according to a fifth embodiment of this invention shown in FIG. 9 includes a larger number of inner magnetic pole portions 16a, 16b, 16c as the first magnetic pole portions, and a larger number of second magnetic pole portions 18a, 18b, 18c, 18d as the second magnetic pole portions, than the oscillator 10 of the first embodiment. That is, three first magnetic pole portions 16a, 16b, 16c are formed by respective three inner yoke members 28a, 28b, 28c which are polarized by two permanent magnets 26a, 26b that are interposed therebetween and mounted on the shaft member 12, while on the other hand four second magnetic pole portions 18a, 18b, 18c, 18d are formed by respective four outer yoke members 44a, 44b, 44c, 44d which are polarized by energization of three coils 42a, 42b, 42c that are interposed between the outer yoke members 44a–44d and fixed to the outer sleeve 14. The coils 44a, 44b, 44c are energized such that the axially adjacent second magnetic pole portions 18 are given opposite poles.

Like the oscillator 10 of the first embodiment, the oscillators 82, 84, 86, 88 of the second, third, fourth and fifth embodiments of FIGS. 6–9 are adapted such that the shaft member 12 and the outer sleeve 14 are held in and returned to the neutral position, by the first magnetic forces acting between the inner and outer magnetic pole portions 16, 18, while the coil or coils 42 is/are placed in the non-energized state, and such that the shaft member 12 and the outer sleeve 14 are axially oscillated relative to each other against the first magnetic forces, by the second magnetic forces acting between the first and second magnetic pole portions 16, 18 when the coil or coils 42 is/are energized. The oscillator 88 of FIG. 9 is capable of providing a comparatively larger oscillating force owing to the use of the relatively larger numbers of the first and second magnetic pole portions 16, 18.

Figure 10:
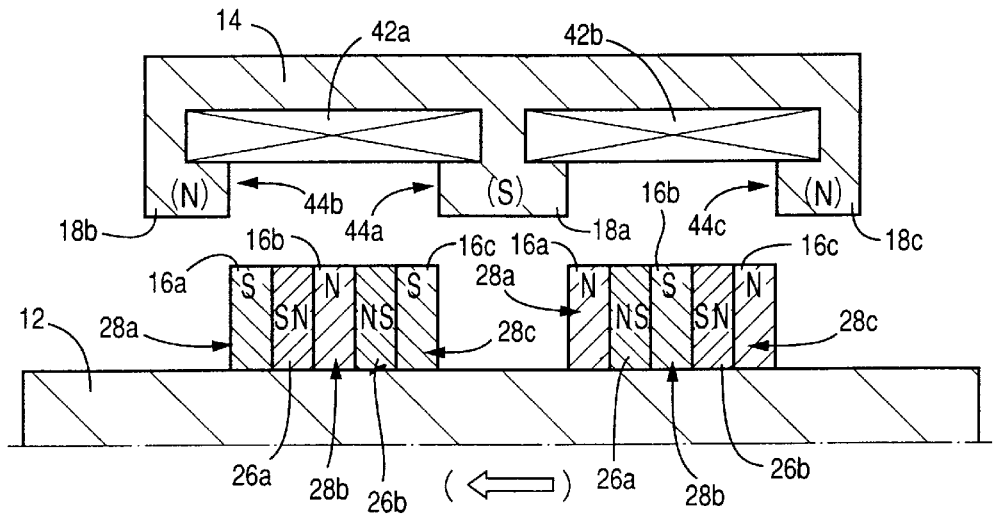
FIG. 10 is a cross sectional view corresponding to that of FIG. 2, showing an active damping oscillator according to a sixth embodiment of the invention.

In the active damping oscillator constructed according to the present invention, the axial spacing interval or pitch of the first magnetic pole portions may be different from that of the second magnetic pole portions. In an active damping oscillator according to a sixth embodiment of the invention shown in FIG. 10, for example, the axial spacing pitch of the second magnetic pole portions in the form of the outer magnetic pole portions 18a, 18b, 18c is considerably larger than that of the first magnetic pole portions in the form of two sets of inner magnetic pole portions 16a, 16b, 16c. Each set of the inner magnetic pole portions 16 consists of three inner magnetized pole portions 16a, 16b, 16c which are spaced apart from each other in the axial direction of the shaft member 12, by the permanent magnets 26a, 26b, such that the three magnetic pole portions 16a, 16b, 16c are located almost within an axial distance or gap between the adjacent outer magnetic pole portions 18a, 18b (or 18a, 18c). In the oscillator of FIG. 10, the axial center of the intermediate inner magnetic pole portion 16b is aligned with the axial center of an axial distance between the adjacent outer magnetic pole portions 18a, 18b (18a, 18c).

Figure 11:
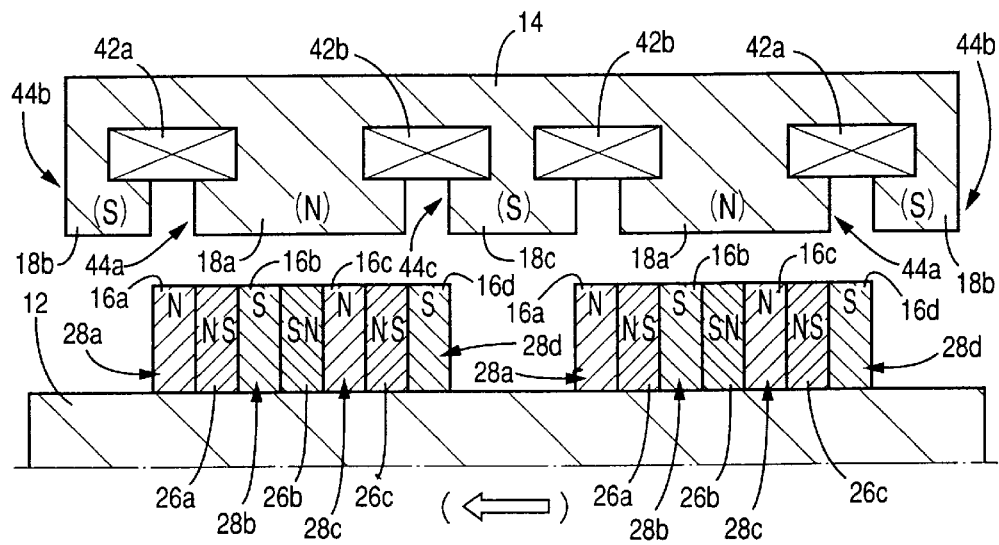
FIG. 11 is a cross sectional view corresponding to that of FIG. 2, showing an active damping oscillator according to a seventh embodiment of the invention.

In an active damping oscillator according to a seventh embodiment of the invention shown in FIG. 11, the second magnetic pole portions consist of two sets of outer magnetic pole portions 18a, 18b, 18c, which include a central outer magnetic pole portion 18c which is commonly used by the two sets indicated above. Each set of outer magnetic pole portions 18a, 18b, 18c includes an intermediate outer magnetic pole portion 18a, which has a larger axial length than the other pole portions 18b, 18c of the same set. On the other hand, the first magnetic pole portions consist of two sets of inner magnetic pole portions 16 each consisting of four magnetic pole portions 16a, 16b, 16c, 16d. Each of the four inner magnetic pole portions 16 of each set has an axial length considerably smaller than those of the outer magnetic pole portions 18a, 18b, 18c. The inner magnetic pole portions 16a, 16b, 16c, 16d of each set are spaced apart from each other in the axial direction of the shaft member 12, by the permanent magnets 26a, 26b, 26c such that the four magnetic pole portions 16a, 16b, 16c are located almost within an axial distance between the two outer ones 18b, 18c of the three outer magnetic pole portions 18a, 18b, 18c of the corresponding set. In the oscillator of FIG. 11, the axial center of each of the two outermost inner magnetic pole portions 16a, 16d is aligned with the axial center of an axial distance between the adjacent outer magnetic pole portions 18a, 18b (18a, 18c).

Figure 12:
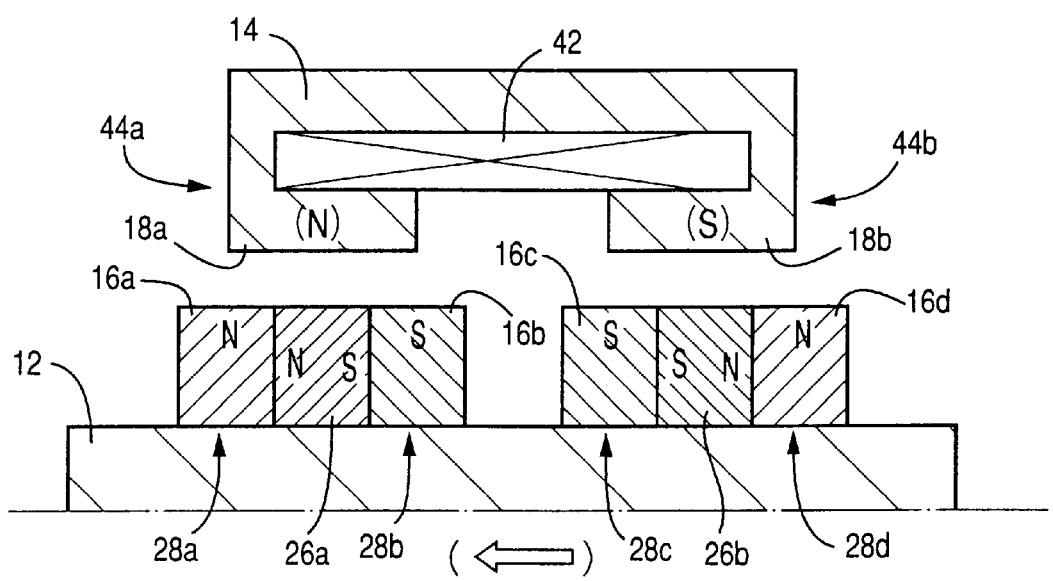
FIG. 12 is a cross sectional view corresponding to that of FIG. 2, showing an active damping oscillator according to an eighth embodiment of the invention.

Referring next to FIG. 12, there is illustrated an active damping oscillator according to an eighth embodiment of the present invention, which includes two sets of inner magnetic pole portions 16a, 16b, 16c, 16d, and two outer magnetic pole portions 18a, 18c. The two sets of inner magnetic pole portions 16a, 16b, 16c, 16d are positioned relative to the two outer magnetic pole portions 18a, 18b in the axial direction of the shaft member 12, such that an axial gap between the two sets of inner magnetic pole portions 16 is located within an axial gap between the two outer magnetic pole portions 18a, 18b. In the oscillator of FIG. 12, the axial center of each of the two outer magnetic pole portions 18a, 18b is aligned with the axial center of an axial distance between the adjacent inner magnetic pole portions 16a, 16b (16c, 16d).

While each of the inner and outer yoke members 28, 44 used in the second through eighth embodiments is shown in FIGS. 6–12 as a single integral structure, it may consist of a plurality of plate or sheet members, like each outer yoke member 44a, 44b, 44c used in the first embodiment of FIG. 1.

Although the several presently preferred embodiments of this invention has been described above, it is to be understood that the invention is not limited to the details of the illustrated embodiments, but may be embodied with various changes, modifications and improvements, which may occur to those skilled in the art, in the light of the foregoing teachings.

For instance, the axial length of the shaft member 12 and/or the outer sleeve 14 may be suitably determined for obtaining a desired force of relative axial oscillation between the shaft member 12 and outer sleeve 14. Further, the shaft member 12 may be a hollow or tubular member, and a suitable weight or mass may be fixed to the shaft member 12 and/or the outer sleeve 14.

Further, the second magnetic pole portions which are polarized by energization of the coil or coils 42 may be provided with a permanent magnet or magnets, so that the second magnetic pole portions are given magnetic poles by the permanent magnet or magnets even while the coil or coils is/are placed in the non-energized state. In this case, the second magnetic force generated by energization of the coil or coils influence in some way the first magnetic force generated by the permanent magnet or magnets provided for the second magnetic pole portions, but the oscillator should be arranged such that the energization of the coil or coils causes the shaft member 12 and the outer sleeve 14 to be axially oscillated relative to each other, as intended.

What is claimed is:

1. An active damping oscillator comprising:
   a shaft member;
   an outer sleeve disposed radially outwardly and independently of said shaft member and axially movable relative to said shaft member;
   a plurality of first magnetic pole portions disposed fixedly to one of said shaft member and said outer sleeve;
   at least one permanent magnet associated with said first magnetic pole portions to give magnetic poles to said first magnetic pole portions;
   a plurality of second magnetic pole portions disposed fixedly to the other of said shaft member and said outer sleeve; and
   at least one coil associated with said second magnetic pole portions and energized to give magnetic poles to said second magnetic pole portions,
   and wherein said first magnetic pole portions and said second magnetic pole portions are opposed to each other in a radial direction of said shaft member with a predetermined radial gap therebetween, and are offset from each other in an axial direction of said shaft member such that said shaft member is held in a predetermined neutral axial position by first magnetic forces of said first magnetic pole portions which act between said first magnetic pole portions and said second magnetic pole portions, while said at least one coil is in a non-energized state, and such that said shaft member and said outer sleeve are moved relative to each other in said axial direction against said first magnetic forces by second magnetic forces which are generated upon energization of said at least one coil and which act between said first magnetic pole portions and said second magnetic pole portions.

2. An active damping oscillator according to claim 1, further comprising a guide mechanism interposed between said shaft member and said outer sleeve, so as to permit a relative axial movement of said shaft member and said outer sleeve while preventing a relative radial movement thereof.

3. An active damping oscillator according to claim 1, wherein said plurality of first magnetic pole portions are positioned relative to each other and relative to said plurality of second magnetic pole portions such that when said shaft member is placed in said predetermined neutral axial position, a center of at least one of said plurality of first magnetic pole portions as seen in said axial direction of said shaft member is aligned with a center of an axial distance between adjacent ones of said plurality of second magnetic pole portions as seen in said axial direction.

4. An active damping oscillator according to claim 3, wherein each of said at least one of said plurality of first magnetic pole portions has an axial length which is larger than said axial distance between said adjacent ones of said plurality of second magnetic pole portions, said each of said at least one of said plurality of first magnetic poler portions being positioned relative to said adjacent ones of said plurality of second magnetic pole portion in said axial direction such that opposite axial end portions of said each of said at least one of said plurality of first magnetic pole portions are opposed to axial end portions of said adjacent ones of said plurality of second magnetic pole portions in said radial direction, with said predetermined radial gap therebetween.

5. An active damping oscillator according to claim 1, wherein said plurality of second magnetic pole portions are positioned relative to each other and relative to said plurality of first magnetic pole portions such that when said shaft member is placed in said predetermined neutral axial position, a center of at least one of said plurality of second magnetic pole portions as seen in said axial direction of said shaft member is aligned with a center of an axial distance between adjacent ones of said plurality of first magnetic pole portions as seen in said axial direction.

6. An active damping oscillator according to claim 5, wherein each of said at least one of said plurality of second magnetic pole portions has an axial length which is larger than said axial distance between said adjacent ones of said plurality of first magnetic pole portions, said each of said at least one of said plurality of second magnetic poler portions being positioned relative to said adjacent ones of said plurality of first magnetic pole portion in said axial direction such that opposite axial end portions of said each of said at least one of said plurality of second magnetic pole portions are opposed to axial end portions of said adjacent ones of said plurality of first magnetic pole portions in said radial direction, with said predetermined radial gap therebetween.

7. An active damping oscillator according to claim 1, wherein said plurality of first magnetic pole portions and said at least one permanent magnet are fixedly disposed on said shaft member such that each of said at least one permanent magnet is interposed between adjacent ones of said first magnetic pole portions, so that said adjacent ones of said first magnetic pole portions have opposite magnetic poles, while said plurality of second magnetic pole portions and said at least one coil are fixedly disposed on said outer sleeve such that each of said at least one coil is interposed between adjacent ones of said second magnetic pole portions, so that said adjacent ones of said second magnetic pole portions have opposite magnetic poles when said each coil is energized.

8. An active damping oscillator according to claim 1, wherein said plurality of first magnetic pole portions and said at least one permanent magnet are fixedly disposed on said outer sleeve such that each of said at least one permanent magnet is interposed between adjacent ones of said first magnetic pole portions, so that said adjacent ones of said first magnetic pole portions have opposite magnetic poles, while said plurality of second magnetic pole portions and said at least one coil are fixedly disposed on said shaft member such that each of said at least one coil is interposed between adjacent ones of said second magnetic pole portions, so that said adjacent ones of said second magnetic pole portions have opposite magnetic poles when said each coil is energized.

9. An active damping oscillator according to claim 1, wherein each of said plurality of first magnetic pole portions is provided by one of a radially outer portion and a radially inner portion of an annular permanent magnet disposed fixedly to one of said shaft member and said outer sleeve, said radially inner and outer portions having opposite magnetic poles, the magnetic pole of said one of said radially inner and outer portions of one of adjacent ones of the annular permanent magnets of said plurality of first magnetic pole portions being opposite to the magnetic pole of said one of said radially inner and outer portions of the other of said adjacent ones of the annular permanent magnets.

10. An active damping oscillator according to claim 1, further comprising a stop mechanism for defining a maximum amount of relative axial movement of said shaft member and said outer sleeve from said predetermined neutral axial position, so as to permit said shaft member to be returned to said neutral axial position after said maximum amount of relative axial movement.

* * * * *